Feb. 6, 1923.
J. O. TOW
SAFETY DEVICE FOR CENTRIFUGAL EXTRACTORS
FILED DEC. 7, 1917
1,444,401
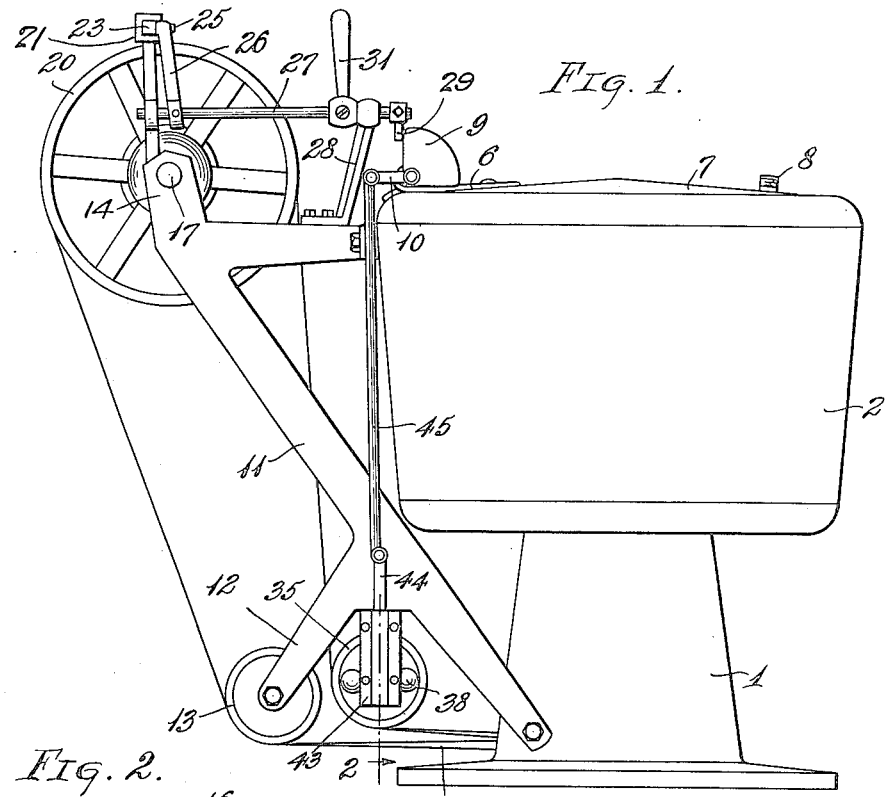
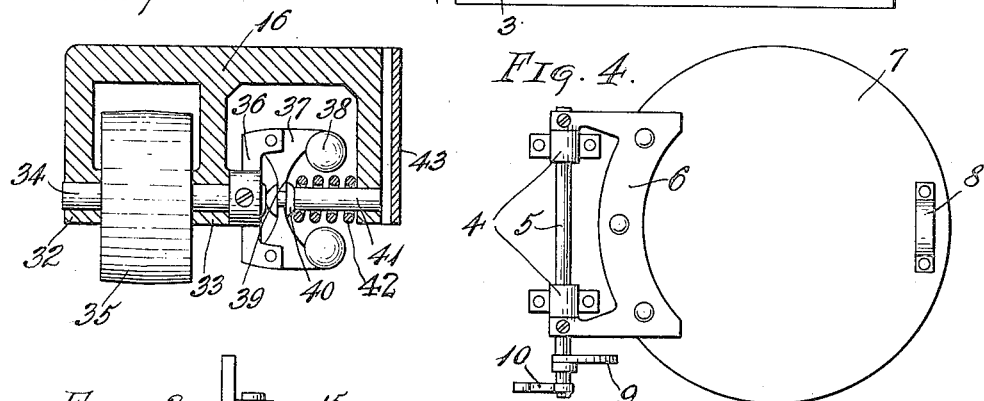
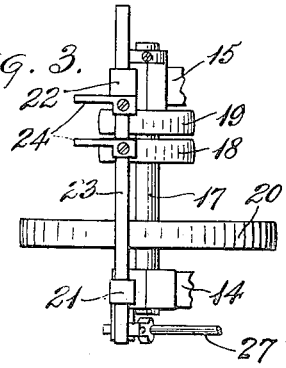
Inventor.
James O. Tow,
by Brockett & Hyde
Attys.

Patented Feb. 6, 1923.

1,444,401

UNITED STATES PATENT OFFICE.

JAMES O. TOW, OF COLUMBIA, MISSOURI, ASSIGNOR TO THE AMERICAN LAUNDRY MACHINERY COMPANY, OF NORWOOD, OHIO, A CORPORATION OF OHIO.

SAFETY DEVICE FOR CENTRIFUGAL EXTRACTORS.

Application filed December 7, 1917. Serial No. 206,028.

*To all whom it may concern:*

Be it known that I, JAMES O. TOW, a citizen of the United States, residing at Columbia, in the county of Boone and State of Missouri, have invented a new and useful Safety Device for Centrifugal Extractors, of which the following is a specification.

This invention relates to extractors and particularly to safety devices for use in connection therewith.

More specifically the invention relates to safety mechanism applied to a belt driven extractor and arranged in a manner such that the belt shifting mechanism can not be operated to apply the power when the cover is open and to prevent the opening of the cover during operation and until the basket has stopped rotating.

Other features of the invention will more fully and at large appear from the following description, drawings and claims.

Referring to the drawings, Figure 1 is a view in elevation showing an extractor provided with my invention; Figure 2 is a vertical section on the line indicated at 2 in Figure 1, the governor arms being turned into the plane of the section; Figure 3 is a top plan view of the driving pulleys and the belt shifting mechanism; Figure 4 is a top plan view of the cover and its connected parts; and Figure 5 is a detail end view of the belt shipper locking segments.

In the drawings, 1 represents a suitable support or base adapted to carry the curb 2 which is of the usual construction, not shown. Within the curb and base are the usual basket, shaft and driving pulley, which are not shown but which are driven by the belt 3.

Secured to the curb in suitable bearings 4 is the cover shaft 5 having secured thereto the cover bracket 6 fastened to the cover 7. The cover is provided with the usual handle 8.

The shaft 5 projects beyond one of the bearings 4 and is there provided with a cover locking segment 9 corresponding to a quadrant of a circle. In the normal position of the cover this quadrant assumes a position in the upper right hand corner of the circle of which it forms a part, as shown in Figure 1.

This projected end of the shaft 5 is also provided with an arm 10, shown in Figures 1 and 4, and which projects horizontally to the rear when the cover is closed.

Secured to the base 1 and to the curb 2 is a pulley bracket 11 provided with an idler arm 12 supporting an idler 13, spaced bearing arms 14 and 15, shown in Figure 3, and an idler support 16.

The bearing arms support the main driving shaft 17 which carries a fast pulley 18 and a loose pulley 19. This main shaft 17 also carries an extractor driving pulley 20 which receives the belt 3.

Suitable belt shifting mechanism is provided and it consists of supporting members 21 and 22 mounted on the pulley bracket 11. These members are provided with square openings receiving a square shifting bar 23 which is equipped with belt engaging arms 24 of a well known construction. The bar extends beyond the supporting member 24 and is connected by a pin 25 to a lever arm 26 fixed to a rock shaft 27 mounted in the supporting member 21 and a rock shaft bracket 28 secured to the frame. The extended end of this rock shaft is provided with a locking element or segment 29 secured to the shaft and provided with a radial recess 30 adapted when in proper position to permit the passage of the cover locking segment therethrough. The rock shaft is further provided with an operating lever 31.

The operation of the mechanism thus far described will now be given. Assuming that the cover is closed, the operator may actuate the belt shifter by manipulating the operating lever with the result that the belt will be shifted from the loose to the tight pulley and the extractor will be started. The cover can not thereafter be raised, however, on account of the cover locking segment engaging the solid portion of the shifter shaft lock segment and being in its path of movement. When the belt is returned to the loose pulley, then the cover may be raised by reason of the cover locking segment being permitted to pass through the recess 30 in the other segment.

In order to prevent the raising of the cover until the speed has dropped to a safe point, mechanism under the control of the rotation of the other idler, not yet described, is arranged to hold the cover closed and this construction will now be described.

Arranged in suitable bearings 32 and 33 in the idler support 16 is an idler shaft 34 carrying an idler 35. The end of the shaft 34, beyond the bearing 33, is provided with a spider 36 having preferably, two diametrically opposed arms each of which carries a lever 37 pivoted in the arm. Each lever is provided with a weight 38 and an inwardly extending arm 39. These arms 39 engage in an annular groove in a collar 40 forming a part of a pin 41, slidably mounted in the idler support 16 in alignment with the shaft 34. A spring 42 surrounds the pin and thrusts against the idler support, on the one hand, and against the collar 40, on the other, and tends to move the weights inward toward the pin in a manner similar to the balls of a governor. In fact, the structure of this portion of the mechanism is similar to a ball governor.

Secured to the end of the idler support 16 is a plate 43 having a guide way in its inner face. This guide way receives a slide 44. The guide and the slide are arranged so that the latter passes the end of the pin 41 when it is withdrawn as shown in figure 2. When the pin 41 is moved to the right as when the weights are thrown outward, then the slide is prevented from moving down in the guide by reason of its engaging the pin 41. The slide 44 is pivotally connected at its upper end to a link 45 which in turn is pivotally connected to the arm 10.

From the foregoing, it will be seen that when the idler 35 is operating the slide is prevented from moving down and the cover is prevented from being raised even though the belt may be shifted onto the loose pulley.

The idler used is one of the main idlers which guide the belt from the driving pulley to the basket pulley, hence its operation is assured at all times when the machine is operating. It is also quite evident that it is not apt to slip by any slight looseness of the belt.

What I claim is:

1. In an extractor, a curb, a cover therefor, a segment carried by said cover, a pulley bracket, a main driving shaft mounted in said bracket, an extractor driving pulley mounted upon said shaft, fast and loose pulleys mounted upon said shaft, a belt shipper mounted upon said bracket, a rock shaft suitably mounted, connections between the rock shaft and the belt shipper, an interrupted segment on the end of said rock shaft, said rock shaft and its segment being so constructed and arranged that the rock shaft segment is in the path of the cover segment when said cover is opened, and a handle for said rock shaft.

2. In a safety device for centrifugal extractors, the combination of a cover mounted on the casing of an extractor, a shaft for shifting a power belt for said extractor, a shaft rotatable through an arc by the cover, a rotary locking element rotatable by said belt shifting shaft, and a second rotary locking element rotatable by said cover-actuated shaft, said rotary locking elements engaging one another to prevent the application of power while the cover is open and the opening of the cover while power is being applied.

JAMES O. TOW.